United States Patent [19]

Smith et al.

[11] Patent Number: 4,605,036
[45] Date of Patent: Aug. 12, 1986

[54] VALVE HOUSING WITH REMOVABLE SELF-CONTAINED VALVING UNIT

[75] Inventors: Russell G. Smith, Cincinnati, Ohio; Michael J. Sandling, Flackwell Heath, England

[73] Assignee: Xomox Corporation, Cincinnati, Ohio

[21] Appl. No.: 5,004

[22] Filed: Jan. 22, 1979

Related U.S. Application Data

[63] Continuation of Ser. No. 808,722, Jun. 22, 1977, abandoned.

[51] Int. Cl.⁴ ............................................. F16K 43/00
[52] U.S. Cl. ................................. 137/327; 137/368; 137/454.6; 251/312; 251/368
[58] Field of Search .................... 137/315, 327, 454.2, 137/454.6, 364, 368; 251/368, 312

[56] References Cited

U.S. PATENT DOCUMENTS

| | | | |
|---|---|---|---|
| 766,753 | 8/1904 | Brooks | 137/227 X |
| 1,861,396 | 5/1932 | Isbell | 137/327 X |
| 2,173,381 | 9/1939 | Waddell | 137/454.6 |
| 2,287,333 | 6/1942 | Walker | 137/454.6 |
| 2,752,119 | 6/1956 | Allen | 137/327 X |
| 3,000,393 | 9/1961 | Mayuand | 137/454.2 |
| 3,150,681 | 9/1964 | Hansen | 137/454.2 |
| 3,204,656 | 9/1965 | Moen | 137/454.2 |
| 3,263,697 | 8/1966 | Reed | 251/175 X |
| 3,330,296 | 7/1967 | Temple | 137/454.2 |
| 3,521,856 | 7/1970 | Smith | 251/172 |
| 3,576,309 | 4/1971 | Zawacki | 137/327 X |
| 3,602,245 | 8/1971 | Meisel | 251/297 X |

FOREIGN PATENT DOCUMENTS 2328995  6/1973  Fed. Rep. of Germany ...... 251/315

Primary Examiner—Harold W. Weakley
Attorney, Agent, or Firm—Kinney and Schenk

[57] ABSTRACT

A self-contained, operative, valving unit which includes a valve body having inlet and outlet ports, and a rotatable valve plug is securely though removably housed within a valve housing having inlet and outlet ports which are permanently secured to pipes through which the fluid media to be controlled is conveyed to and from the housing, and wherein the entire valving unit, per se, is received within a valving-unit-receptive bore of the valve housing with its inlet and outlet ports in cooperative, aligned, fluid tight relationship with respect to corresponding inlet and outlet ports interiorly of the valve housing whereby the flow of fluid media through the valve housing is controlled by the removable valving unit.

14 Claims, 7 Drawing Figures

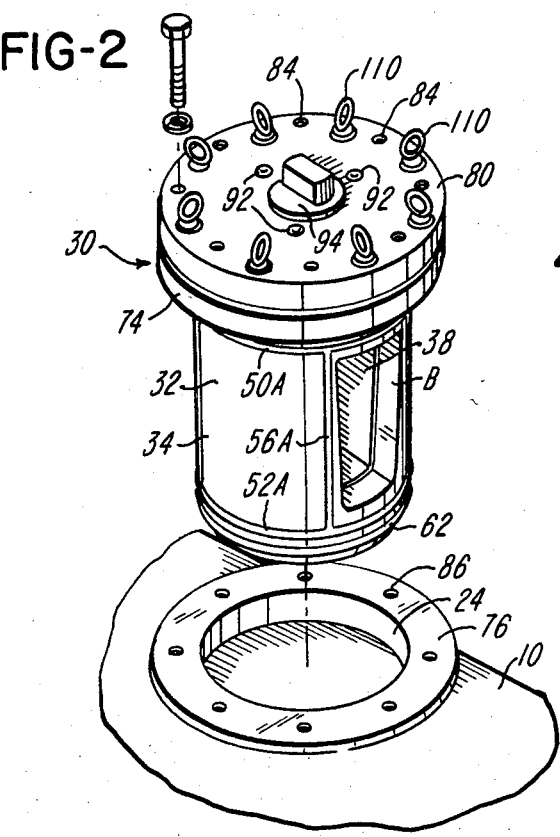
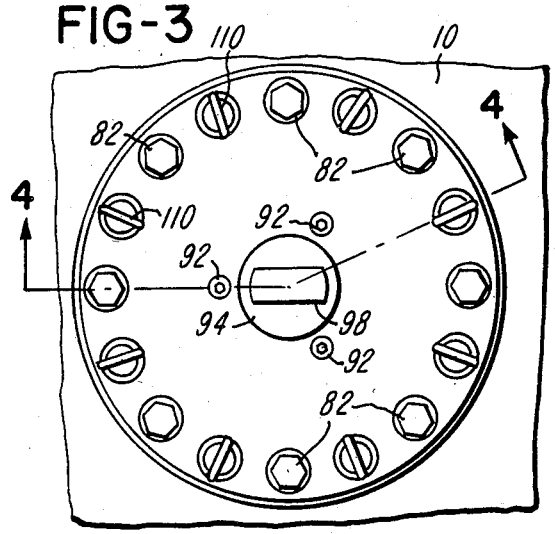
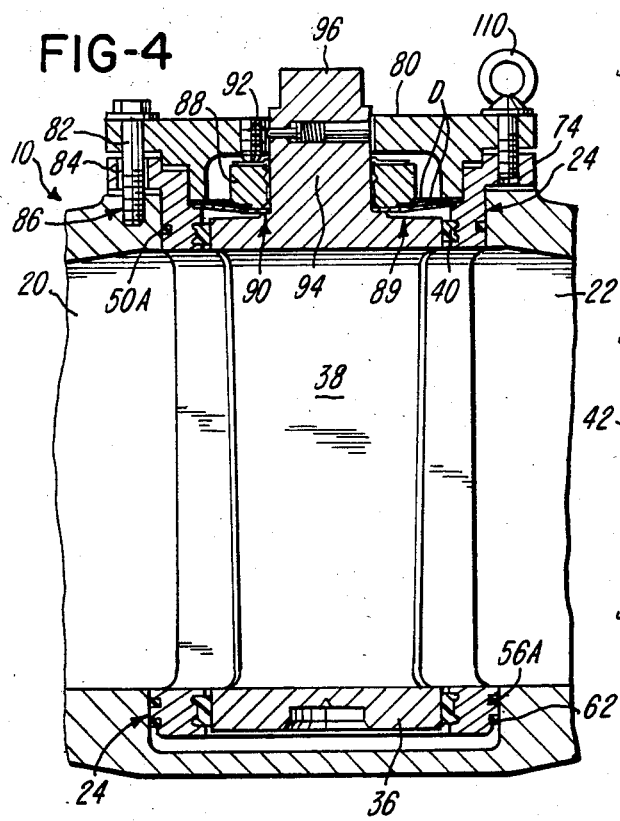
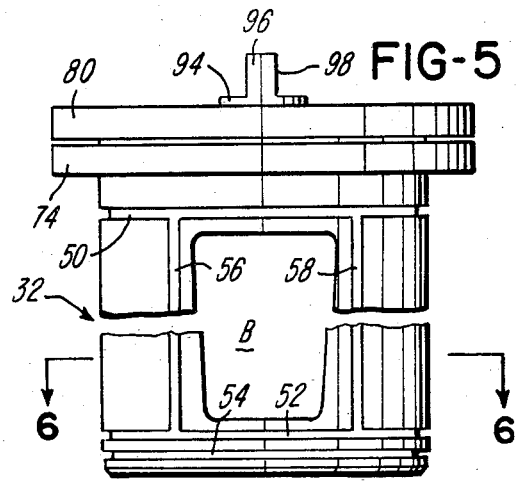
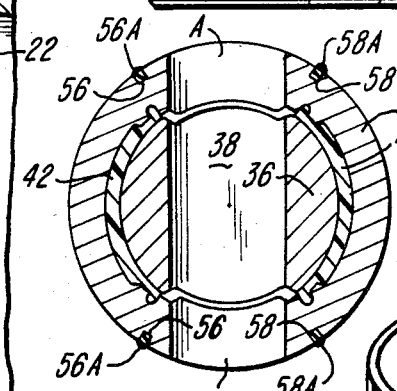
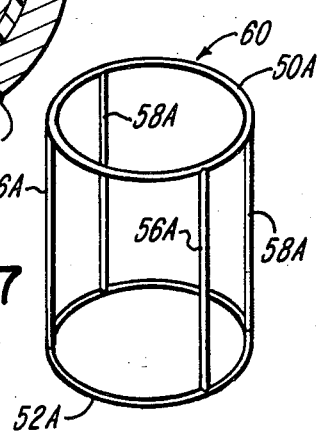

VALVE HOUSING WITH REMOVABLE SELF-CONTAINED VALVING UNIT

This is a continuation of application Ser. No. 808,722, filed June 22, 1977 now abandoned.

BACKGROUND OF THE INVENTION

1. Field of the Invention

The field of the invention relates to valves which are adapted to control the flow of radioactive slurries passing through welded pipelines, wherein the valves are located in relatively inaccessible locations, in underground sumps, in pits or under water. Since the media is radioactive and the location of the valves is relatively inaccessible, it is important that the valve, per se, be easily replaced.

2. Description of the Prior Art

U.S. Pat. No. 3,809,114 dated May 7, 1974, to J. W. Mueller, et al, discloses an underground valve the body of which is secured to underground inlet and outlet pipes by bolted flanges. The valve plug 14, which is rotatably by its stem 17 which is secured to shaft 30, includes lifting pins 21 which engage slots in the lower ends of a pair of diametrically disposed slip members 20, 20. When bonnet 28 which is bolted to the upper end of a tubular extension 33 which extends upwardly from the valve body, is removed, the shaft 30, stem 17, valve plug 14, slip members 20, top plate 18 and hold down sleeve 39 are released for withdrawal, upwardly, through extension 33. The valve body remains underground bolted to the pipes through which the media being controlled passes.

U.S. Pat. No. 3,081,792 dated Mar. 19, 1963, to G. E. Hansen discloses a Ball Valve with Removable Cartridge Unit wherein a spherical valving member is rotatably journaled within a hollow valve plug or cage of frusto-conical configuration which tapers from a maximum lower diameter to a lesser upper diameter, said cage being snuggly fitted within a complimentary, tapered bore within valve body 1. The cage is secured in place with respect to the body member by means of a thrust washer 56 which exerts a continuous upward pull to the casing for securing it to and in the valve body. The operating stem for the ball extends upwardly from the valve plug or cage thereby precluding removal of the valving elements of the device absent free access to both the upper and lower portions of the valve body.

U.S. Pat. No. 3,179,121 dated Apr. 20, 1965 to K. B. Bredtschneider et al discloses a Removable Head and Seat Unit Ball Valve Construction wherein a spherodial closure member and its respective valve seats may be removed as a unit from the valve body.

Applicants are likewise aware of the following U.S. patents:

U.S. Pat. No. 2,997,057 dated Aug. 22, 1961 to L. R. Toth

U.S. Pat. No. 3,100,501 dated Aug. 13, 1963 to G. E. Hansen, et al

U.S. Pat. No. 3,132,836 dated May 12, 1964 to J. L. Dickerson, et al

U.S. Pat. No. 3,150,681 dated Sept. 29, 1964 to G. E. Hansen, et al

U.S. Pat. No. 3,186,680 dated June 1, 1965 to E. P. Pool

U.S. Pat. No. 3,362,433 dated Jan. 9, 1968 to I. J. Heinen

U.S. Pat. No. 3,450,384 dated June 17, 1969 to J. D. Watts

U.S. Pat. No. 3,522,820 dated Aug. 4, 1970 to J. D. Watts

SUMMARY OF THE INVENTION

A self-contained, fully operative, valving unit is removably associated with a valve housing which is permanently secured in a pipeline capable of handling radioactive media.

The valve housing may be located in relatively inaccessible areas such as in a pit or sump or as to effectively minimize radiation exposure.

The valving unit is constructed in such a manner as to permit its ready removal from and/or replacement in the valve housing from locations remote therefrom, wherein the relationship between the valving unit and valving housing is such that when associated, the former effectively controls the flow of media through the latter.

BRIEF DESCRIPTION OF THE DRAWINGS

FIG. 2 is a perspective view of the valving unit ready to be inserted into and associated with the valving-unit-receptive bore of the valve housing.

FIG. 3 is a top view of the valving unit operatively associated with the valve housing.

FIG. 4 is a sectional view taken on line 4—4 of FIG. 3.

FIG. 5 is a side elevational view of the valving member, per se.

FIG. 6 is a sectional view taken on line 6—6 of FIG. 5.

FIG. 7 is a perspective view of a seal harness which comprises a detail of the invention.

DESCRIPTION OF THE PREFERRED EMBODIMENTS

Figure 1:
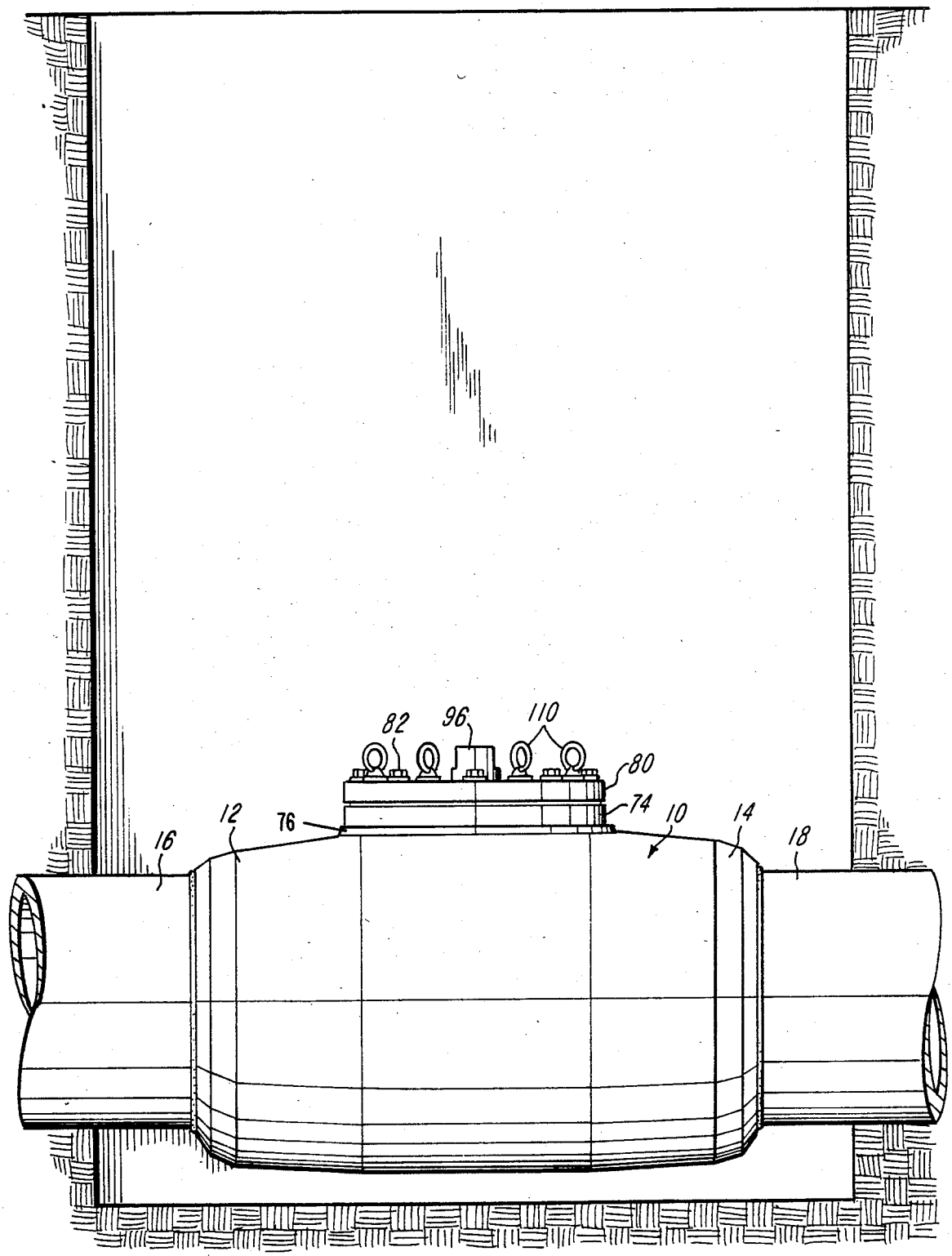
FIG. 1 is a side elevational view of the valve housing of the present invention located in a pit or sump in a condition of containment to negate or substantially minimize the escape of radioactive particles into the surrounding area.

The numeral 10 designates an elongate valve housing of the type which is adapted to be located in a relatively inaccessible area such as, by way of example, in a pit or underground sump area where it may be totally confined or contained, particularly in those instances in which it is used in conjunction with piping to control fluid media which contains radioactive materials.

The valve housing 10 is provided with outer inlet and outlet ports and with inner inlet and outlet ports, wherein the outer inlet and outlet ports are defined by the outer, pipe receptive ends 12 and 14 which are rigidly and permanently secured to pipes 16 and 18 by means of welding, whereby the housing 10 is immovably located in the line through which the media to be controlled passes. In some instances the housing 10 is located under water.

The inner inlet and outlet ports of the housing 10 are designated by the numerals 20 (see FIG. 4) and 22, respectively, each of which is provided in an elongate, internal, upwardly opening, centrally disposed bore 24 which may be cylindrical, or preferably tapered from a larger diameter adjacent its upper end to a smaller diametric dimension at its lower end. The lower end of the bore 24 is completely closed, as shown in FIG. 4, whereby all access to the interior of housing 10, when associated in a line as in FIG. 1, is via the open upper end of the bore 24.

A complete, fully operative, self-contained valving unit 30 (see FIG. 2) is adapted to be securely, though releasably, received within and operatively associated with the bore 24 of the housing 10, with its inlet and outlet ports A (see FIG. 6) and B in precise sealed alignment with the inner ports 20 (see FIG. 4) and 22 of the housing 10.

The valving unit 30 (see FIG. 2) includes a valve body 32 having an outer surface 34 which is the compliment of the bore 24 of the housing 10 to provide a slip fit with the bore 24 and having an inner, elongate, valving-member-receptive bore, in which a valving-member 36 (see FIGS. 4 and 6) is rotatably journaled within a liner of a non-metallic, inherently slippery, self-lubricating material such as polytetrafluoroethylene which forms continuous circular seals 40 adjacent opposite ends of the valving member 36, note FIG. 4, and which forms intermediate sealing areas 42, as illustrated in FIG. 6. The liner, which forms the seals 40 and the sealing areas 42, is located between the valving member 36 and corresponding portions of the valving-member-receptive bore of the valve body 32. The valving member 36 includes a passageway 38 which is adapted to be disposed in or out of alignment with the ports A-B of the valve body 32, note FIG. 6.

As best illustrated in FIG. 5, the outer surface of the valve body 32 is provided with an upper circumferential groove 50 and a pair of laterally spaced lower circumferential grooves 52 and 54, and with pairs of longitudinal grooves 56 and 58 which are disposed on opposite sides of the ports A and B. The respective upper and lower ends of the grooves 56 and 48 intersect, terminate at, and are in open communication with the grooves 50 and 52.

A harness 60, illustrated in FIG. 7, having upper and lower circumferential rings 50A and 52A, and interconnected longitudinal elements 56A and 58A, is fabricated from a suitable elastomeric material which is preferably radiation resistant, such as, by way of example, a product of DuPont which is sold under the trademark NORDEL.

The harness 60 is receivable in the corresponding grooves 50 (see FIG. 5), 52, 56, and 58 of the valve body 32 (see FIG. 2) whereby to be compressed when the valve body 32 is inserted into the bore 24 of the housing 10.

An O-ring 62 is disposed within the lowest circumferential groove 54.

The upper portion of the valve body 32 is provided with an out-turned flange 74 which is adapted and dimensioned to overlie flange 76 which surrounds and is integral with the upper open end of the bore 24 of the housing 10.

A cover plate 80 is secured to the flange 76 of the housing 10 by means of bolts 82 (see FIGS. 3 and 4) which extend through aligned holes 84 in the cover plate 80 and the flange 74 of the valve body 32 and extend into tapped holes 86 of the housing flange 76. A floating thrust collar or gland 88 (see FIG. 4) is interposed between portions of the cover plate 80 and upper end 89 of the valving member 36 which is provided with a centrally disposed raised, annular shoulder 90; the thrust collar being urged downwardly toward the upper end of the valving member 36 by means of a plurality of set screws 92 which extend through and threadably engage the cover plate 80, as illustrated in FIG. 4.

A shank 94 of the valving member 36 projects upwardly from the raised shoulder 90 and terminates in a free outer end 96 which may be provided with flats 98 (see FIG. 3) to receive a suitable wrench, handle or means, either manual or powered, for enabling an operator to impart a turning torque to the valving member 36.

In the preferred embodiment of the invention, one or more diaphragms D (see FIG. 4) are interposed between the cover plate 80 and the flange 74 of the valve body 32, and between the thrust collar 88 and the raised shoulder 90 of the valving member 36, as more fully disclosed in U.S. Pat. No. 3,294,408 to R. C. Smith.

With particular reference to FIG. 4, the numeral there is shown a spring-loaded grounding pin which is carried by the shank 94 of the valving member 36, the free outer end of which is disposed in electrical contact with the inner surface of the shank-receptive opening of the cover plate 80 to preclude the existence of a potential differential between the valve member 36, the valve body 32, and the housing 10.

Reference is made to U.S. Pat. No. 3,263,697 for a more detailed disclosure of the structural details and relationship between the liner, the valving member 36 and the valving-member-receptive bore of the valve body 32.

The subject device is particularly well adapted for radioactive service, wherein the radioactive media being controlled consists of a slurry which makes it essential that the valving mechanism be easily removed from and replaced in the valve housing 10 without disturbing the fixed relationship of the housing 10 with respect to the piping 16 (see FIG. 1) and 18.

In the preferred embodiment of the invention, a purality of eye-bolts 110 (see FIGS. 2 and 4) is threadably secured to the flange 74 of the valve body 32, the bolts 110 projecting through axially aligned holes in the cover plate 80 and being disposed in alternating relationship with respect to the bolt holes 84 in which the bolts 82 are received.

When it is desired to remove the self-contained valving unit 30 from the housing 10, the bolts 82 are removed from a location above the 10 housing by means of a suitable extension wrench, or the like, which is lowered into the area in which it is located. Then the entire valve unit 30, including the harness 60, may be bodily withdrawn from the bore 24 of the housing 10 by any suitable means attached to two or more of the eye-bolts 110. After the valve unit 30 has been suitably decontaminated, it may be disassembled, inspected and/or serviced, or another valve unit 30 may be immediately replaced in the housing 10 by reversing the aforesaid process of removing the valve unit 30.

From the foregoing it will be noted that we have provided simple yet highly effective means for providing a valve housing with a removable valve unit insert.

What is claimed is:

1. A valve assemblage comprising a valve-receptive outer housing and a removable self-contained valve unit which is received in said housing for controlling the flow of fluid through said housing wherein:

said housing includes a centrally disposed upwardly opening bore the lower end of which is closed so that access to said bore occurs only via the open top thereof, axially aligned outer inlet and outlet ports spaced outwardly from and on opposite sides of said bore, said ports defining means for connecting said housing in a pipe line, and axially aligned inner inlet and outlet ports in open communication with said bore and in laterally spaced relationship with said corresponding outer inlet and outlet ports and in communication therewith;

said valve unit is removably mounted in said bore of said housing, said valve unit includes a valve body and a rotatable valving member unconnected to each other, said valve body has an upwardly opening bore therein for the reception of said rotatable valving member, said valve body provides subjacent support for said rotatable valving member to prevent downward movement of said rotatable valving member with respect to said valve body, said valve body includes axially aligned inlet and outlet ports communicating with said bore in said valve body, said valving member has a passage extending therethrough for movement into and out of alignment with said inlet and outlet ports in said valve body, said valving member blocking said inlet and outlet ports in said valve body when said passage in said valving member is out of alignment with said inlet and outlet ports in said valve body, and sealing means is disposed between said valve body and said valving member to prevent contact between said valve body and said valving member while preventing fluid leakage therebetween;

means to releasably connect said valve body to said housing;

means attached to said valve body and accessible from a location above and remote from said housing for withdrawing or lowering said valve unit from or into said bore in said housing, said attached means extending upwardly from said valve body and being accessible irrespective of whether said valve body is releasably connected to said housing by said releasable connecting means;

rotation means, separate from and independent of said attached means, accessible from a location above and remote from said housing to enable rotation of said valving member within said valve body;

and each of said attached means and said rotation means being accessible from a location above and remote from said housing without the other of said attached means and said rotation means being moved.

2. The valve assemblage according to claim 1 in which:

said valve body has an out-turned flange circumscribing the upper open end of said bore in said valve body;

and said attached means is attached to said flange of said valve body.

3. The valve assemblage according to claim 2 including said housing having a mounting flange circumscribing said bore in said housing, said flange of said valve body being disposed in overlying relationship to said mounting flange of said housing, a cover plate overlying the upper surface of said flange of said valve body, said attached means connecting said cover plate to said flange of said valve body and extending upwardly beyond said cover plate, and said releasable connecting means connecting said cover plate and said flange of said valve body to said mounting flange of said housing.

4. The valve assemblage according to claim 3 including an electrical grounding pin solely supported by said valving member and disposed to always contact said cover plate to prevent a potential differential between said housing, said valve body, and said valving member.

5. The valve assemblage according to claim 4 in which said rotation means is integral with said valving member, said cover plate has an opening in the center thereof, said rotation means extends through said opening in said cover plate, said rotation means carries said grounding pin, and said rotation means has means to resiliently bias said grounding pin into contact with said cover plate.

6. The valve assemblage according to claim 3 in which said attached means comprises a plurality of eye-bolts, and each of said eye-bolts is disposed substantially the same radial distance from the axis of rotation of said valving member.

7. The valve assemblage according to claim 1 wherein said valve body is dimensioned for a slip fit within said bore of said valve housing, said valve body has circumferential grooves in its outer surface disposed above and below said ports therein, said valve body has a pair of longitudinal grooves disposed on opposite sides of each of said ports wherein the opposite ends of each pair of said longitudinal grooves are in open communication with said circumferential grooves, and resilient means are housed within and project from said grooves to engage said bore in said valve housing for providing a fluid-tight connection between each of said ports in said valve body and said communicating inner port in said housing.

8. The valve assemblage according to claim 7 wherein said resilient means comprises a unitary harness fabricated from an elastomeric material, said harness includes upper and lower circumferential rings, a first pair of longitudinal elements connecting said rings together and disposed in said pair of said longitudinal grooves on opposite sides of one of said ports in said valve body, and a second pair of longitudinal elements connecting said rings together and disposed in said pair of said longitudinal grooves on opposite sides of the other of said ports in said valve body.

9. The valve assemblage according to claim 8 in combination with a first pipe fixed to said housing and communicating with said outer inlet port in said housing, a second pipe fixed to said housing and communicating with said outer outlet port in said housing, and said first and second pipes and said housing having a radioactive media flowing therethrough and controlled by the position of said valving member in said valve body, and said elastomeric material of said harness being resistant to the radioactive media.

10. The valve assemblage according to claim 1 in combination with a first pipe fixed to said housing and communicating with said outer inlet port in said housing, a second pipe fixed to said housing and communicating with said outer outlet port in said housing, and said first and second pipes and said housing having a radioactive media flowing therethrough and controlled by the position of said valving member in said valve body.

11. A valve assemblage comprising a valve-receptive outer housing and a removable self-contained valve unit which is received in said housing for controlling the flow of fluid through said housing wherein:

said housing includes a centrally disposed upwardly opening bore, outer inlet and outlet ports, and inner inlet and outlet ports in open communication with said bore and in laterally spaced relationship with said corresponding outer inlet and outlet ports and in communication therewith;

a first pipe is fixed to said housing and communicating with said outer inlet port in said housing, a second pipe is fixed to said housing and communicating with said outer outlet port in said housing, said valve unit is removably mounted in said bore of said housing, and said bore of said housing is formed to provide closed communication of said pipes with each other when said valve unit is removed from said bore of said housing except for the upward opening in said bore of said housing through which said valve unit is removed so that leakage of fluid is prevented;

said valve unit includes a valve body and a rotatable valving member unconnected to each other, said valve body has an upwardly opening bore therein for the reception of said rotatable valving member, said valve body provides subjacent support for said rotatable valving member to prevent downward movement of said rotatable valving member with respect to said valve body, said valve body includes inlet and outlet ports communicating with said bore in said valve body, said valving member has a passage extending therethrough for movement into and out of communication with said inlet and outlet ports in said valve body, said valving member blocking said inlet and outlet ports in said valve body when said passage in said valving member is not in communication with said inlet and outlet ports in said valve body, and sealing means is disposed between said valve body and said valving member to prevent contact between said valve body and said valving member while preventing fluid leakage therebetween;

means to releasably connect said valve body to said housing;

means attached to said valve body and accessible from a location above and remote from said housing for withdrawing or lowering said valve unit from or into said bore in said housing, said attached means extending upwardly from said valve body and being accessible irrespective of whether said valve body is releasably connected to said housing by said releasable connecting means;

rotation means, separate from and independent of said attached means, accessible from a location above and remote from said housing to enable rotation of said valving member within said valve body;

and each of said attached means and said rotation means being accessible from a location above and remote from said housing without the other of said attached means and said rotation means being moved.

12. The valve assemblage according to claim 11 in which:

said valve body has an out-turned flange circumscribing the upper open end of said bore in said valve body;

and said attached means is attached to said flange of said valve body.

13. The valve assemblage according to claim 12 including said housing having a mounting flange circumscribing said bore in said housing, said flange of said valve body being disposed in overlying relationship to said mounting flange of said housing, a cover plate overlying the upper surface of said flange of said valve body, said attached means connecting said cover plate to said flange of said valve body and extending upwardly beyond said cover plate, and said releasable connecting means connecting said cover plate and said flange of said valve body to said mounting flange of said housing.

14. The valve assemblage according to claim 13 in which said attached means comprises a plurality of eye-bolts, and each of said eye-bolts is disposed substantially the same radial distance from the axis of rotation of said valving member.

* * * * *